United States Patent
Huang et al.

(10) Patent No.: US 12,043,003 B2
(45) Date of Patent: Jul. 23, 2024

(54) ASSEMBLIES AND METHODS FOR FORMING FIBER REINFORCED THERMOPLASTIC STRUCTURES

(71) Applicant: ROHR, INC., Chula Vista, CA (US)

(72) Inventors: Jonathan S. Huang, Pasadena, CA (US); Jeffrey D. Woods, Beaumont, CA (US); Michael Van Tooren, San Diego, CA (US); Noushin Bahramshahi, Mission Viejo, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/577,971

(22) Filed: Jan. 18, 2022

(65) Prior Publication Data
US 2023/0226780 A1    Jul. 20, 2023

(51) Int. Cl.
| | |
|---|---|
| *B29C 70/34* | (2006.01) |
| *B29C 70/20* | (2006.01) |
| *B29C 70/54* | (2006.01) |
| *B29K 101/12* | (2006.01) |
| *B29K 105/10* | (2006.01) |

(52) U.S. Cl.
CPC ............ *B29C 70/342* (2013.01); *B29C 70/20* (2013.01); *B29C 70/543* (2013.01); *B29K 2101/12* (2013.01); *B29K 2105/106* (2013.01)

(58) Field of Classification Search
None
See application file for complete search history.

(56) References Cited

U.S. PATENT DOCUMENTS

| | | |
|---|---|---|
| 4,194,938 A | 3/1980 | Figge et al. |
| 4,957,802 A | 9/1990 | Mentzer et al. |
| 10,717,212 B2 | 7/2020 | Parkinson et al. |
| 11,027,856 B2 | 6/2021 | Sang et al. |
| 2011/0005666 A1 | 1/2011 | Burchell |
| 2012/0145319 A1 | 6/2012 | Schaaf et al. |
| 2014/0110633 A1 | 4/2014 | Pratte et al. |
| 2019/0152168 A1 | 5/2019 | Tobin et al. |
| 2021/0331432 A1 | 10/2021 | Tobin et al. |
| 2021/0394467 A1 | 12/2021 | Wadsworth |
| 2023/0226780 A1* | 7/2023 | Huang .............. B29C 70/086 264/257 |

FOREIGN PATENT DOCUMENTS

| | | |
|---|---|---|
| DE | 102009017112 | 10/2010 |
| DE | 102011056637 | 6/2013 |

(Continued)

OTHER PUBLICATIONS

USPTO; Non-Final Office Action dated May 4, 2023 in U.S. Appl. No. 17/577,923.

(Continued)

*Primary Examiner* — Robert J Grun
(74) *Attorney, Agent, or Firm* — SNELL & WILMER L.L.P.

(57) ABSTRACT

A method for forming a fiber reinforced thermoplastic part may comprise the steps of locating a thermoplastic material over a mold tool, heating the thermoplastic material to a pliable forming temperature, conforming the thermoplastic material to a mold surface of the mold tool, and depositing a plurality of fiber strips over the thermoplastic material.

14 Claims, 16 Drawing Sheets

(56) References Cited

FOREIGN PATENT DOCUMENTS

| EP | 3575066 | 12/2019 |
|----|---------|---------|
| WO | 2010010084 | 1/2010 |
| WO | 2010135318 | 11/2010 |
| WO | 2021079116 | 4/2021 |
| WO | 2021262927 | 4/2021 |

OTHER PUBLICATIONS

European Patent Office, European Search Report dated Jun. 16, 2023 in Application No. 23151840.8.
European Patent Office, European Search Report dated Jun. 15, 2023 in Application No. 23152195.6.
USPTO; Non-Final Office Action dated Sep. 11, 2023 in U.S. Appl. No. 17/577,923.
USPTO; Non-Final Office Action dated Feb. 16, 2024 in U.S. Appl. No. 17/577,923.
USPTO; Final Office Action dated Nov. 30, 2023 in U.S. Appl. No. 17/577,923.

\* cited by examiner

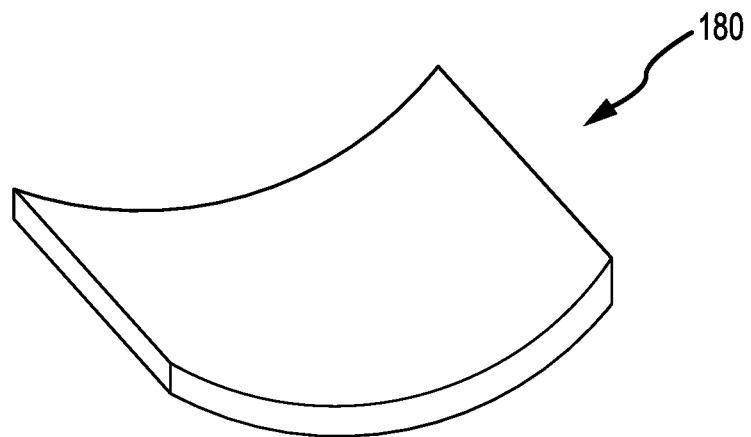
FIG. 5
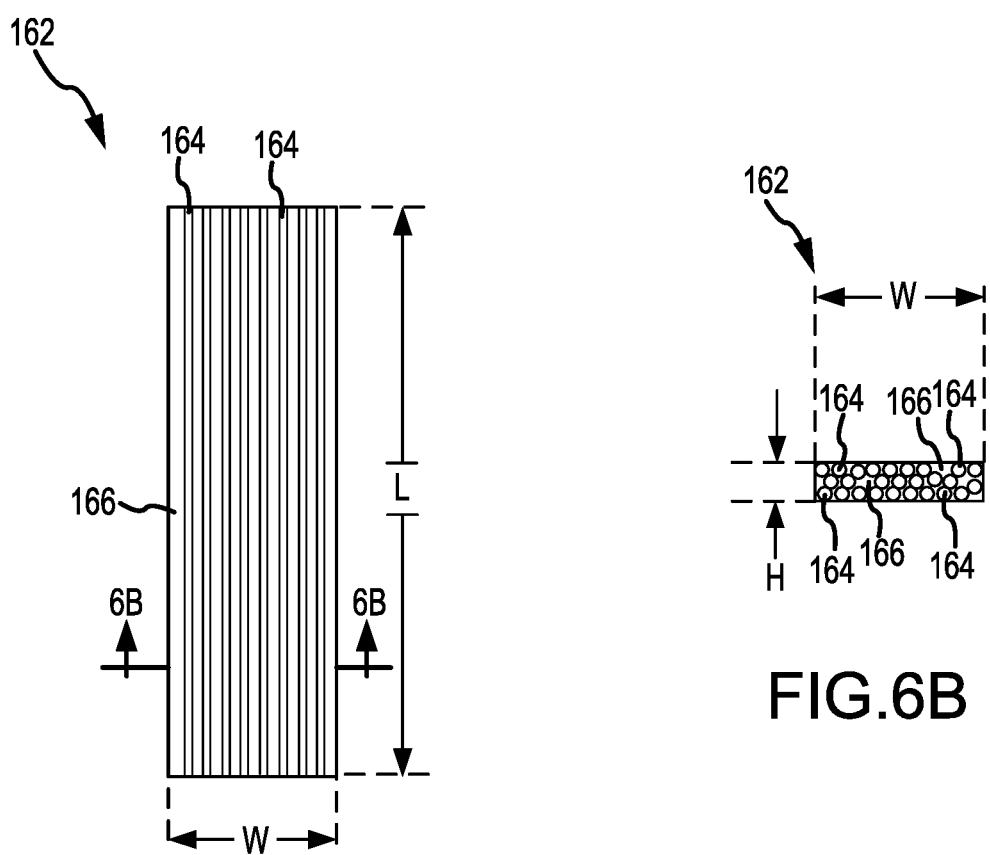
FIG. 6A
FIG. 6B

ASSEMBLIES AND METHODS FOR FORMING FIBER REINFORCED THERMOPLASTIC STRUCTURES

FIELD

The present disclosure relates generally to thermoplastics manufacturing, and more specifically to assemblies and methods for forming fiber reinforced thermoplastic structures.

BACKGROUND

Various industries include components having multi-dimensional charges for various uses. In particular, the aerospace industry utilizes nacelles for providing a protective housing around gas turbine engine components as well as for providing an aerodynamic surface for reducing drag, among other applications. Various nacelle structures (e.g., inlet, fan cowls, skins, etc.) may be made from fiber reinforced materials. Fiber reinforced structures are typically formed using automated fiber placement systems, wherein fiber reinforced strips, "slit tape" or "tows," are applied over the surface of a mold tool. Prior to applying the first layer of tows, a patch work of polyimide film is manually taped to the surface of the mold tool so that the initial layer of tows will stay in place on the mold surface. This mold preparation can be cumbersome, error prone, and costly.

SUMMARY

A method for forming a fiber reinforced thermoplastic part is disclosed herein. In accordance with various embodiments, the method comprises the steps of locating a thermoplastic material over a mold tool, heating the thermoplastic material to a pliable forming temperature, conforming the thermoplastic material to a mold surface of the mold tool, and depositing a plurality of fiber strips over the thermoplastic material.

In various embodiments, conforming the thermoplastic material to the mold surface of the mold tool comprises forming an airtight seal between the thermoplastic material and the mold tool, and evacuating air from between the thermoplastic material and the mold surface of the mold tool.

In various embodiments, heating the thermoplastic material to the pliable forming temperature comprises heating the thermoplastic material with the thermoplastic material spaced apart from the mold surface.

In various embodiments, depositing the plurality of fiber strips over the thermoplastic material includes the steps of depositing a first layer of fiber strips on the thermoplastic material, and depositing a second layer of fiber strips on the first layer of fiber strips. In various embodiments, the method further comprises the step of applying heat and pressure to the first layer of fiber strips prior to depositing the second layer of fiber strips.

In various embodiments, the pliable forming temperature is greater than or equal to a glass transition temperature of the thermoplastic material and less than a melting point of the thermoplastic material. In various embodiments, locating the thermoplastic material over the mold tool includes extending the thermoplastic material continuously from a first edge of the mold surface to a second edge of the mold surface. The second edge is opposite the first edge.

In various embodiments, locating the thermoplastic material over the mold tool includes disposing an exterior surface of the thermoplastic material in a concave configuration. The exterior surface may face a plurality of heater units. Heating the thermoplastic material to the pliable forming temperature may include at least one of disposing each heater unit of the plurality of heater units in at least substantially equally-spaced relation to the exterior surface and/or having one or more of the heater units disposed in different orientations (including where each heater unit is disposed in a different orientation).

In various embodiments, evacuating air from between the thermoplastic material and the mold surface of the mold tool comprises powering on a vacuum fluidly coupled to a channel defined by the mold tool. In various embodiments, the method further comprises the step of releasing the thermoplastic material from the mold tool by turning off the vacuum.

An assembly for forming a fiber reinforced thermoplastic part is also disclosed herein. In accordance with various embodiments, the assembly comprises a mold tool having a mold surface and a plurality of attachment frames located around a perimeter of the mold surface and configured to form an airtight seal with a thermoplastic material located over the mold tool. A vacuum is configured to evacuate air from over the mold surface. A fiber dispensing assembly is configured to deposit a plurality of fiber strips over the mold surface.

In various embodiments, a heating element is configured to heat the thermoplastic material to a pliable forming temperature prior to deposition of the plurality of fiber strips. In various embodiments, the heating element includes a plurality of heating units.

In various embodiments, each heater unit of the plurality of heater units may be at least substantially equally-spaced from the mold surface. One or more of the heater units may be disposed in a different orientation, including where each heater unit is disposed in a different orientation.

In accordance with various embodiments, a method for forming a fiber reinforced thermoplastic part may comprise the steps of locating a thermoplastic material over a mold tool such that the thermoplastic material is spaced apart from a mold surface of the mold tool, heating the thermoplastic material to a pliable forming temperature, evacuating air from between the thermoplastic material and the mold surface, and depositing a plurality of fiber strips over the thermoplastic material.

In various embodiments, the method may further comprise the step of forming an airtight seal between the thermoplastic material and a plurality of attachment frames located around a perimeter of the mold surface. In various embodiments, forming the airtight seal between the thermoplastic material and the plurality of attachment frames may comprise attaching a tape to the thermoplastic material the plurality of attachment frames. In various embodiments, forming the airtight seal between the thermoplastic material and the plurality of attachment frames may comprise locating a frame on an exterior surface of the thermoplastic material In various embodiments, the method may further comprise the step of consolidating a first fiber strip of the plurality of fiber strips with the thermoplastic material by heating the thermoplastic material and the first fiber strip to a temperature sufficient to melt both the thermoplastic material and a matrix material of the first fiber strip.

In various embodiments, heating the thermoplastic material to the pliable forming temperature may include at least one of disposing each heater unit of the plurality of heater units in at least substantially equally-spaced relation to the first surface and/or having one or more of the heater units disposed in different orientations (including where each heater unit is disposed in a different orientation).

In various embodiments, the method may further comprise the step of releasing the thermoplastic material from the mold tool by turning off a vacuum fluidly coupled to a channel extending to the mold surface.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5 illustrates a fiber reinforced thermoplastic part, in accordance with various embodiments;

FIGS. 6A and 6B illustrate a plan view and a cross-section view, respectively, of a fiber strip, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The assemblies and methods, as described herein, may be used to form fiber reinforced thermoplastic structures. The assemblies and methods, described herein, provide relatively quick manufacturing, e.g., as compared to conventional automated fiber placement systems wherein an initial layer of polyimide tape strips are applied to the mold surface. The assemblies and methods, described herein, may provide a manufacturing process for forming relatively complex geometry, while minimizing, or eliminating, wrinkling.

Figure 1:
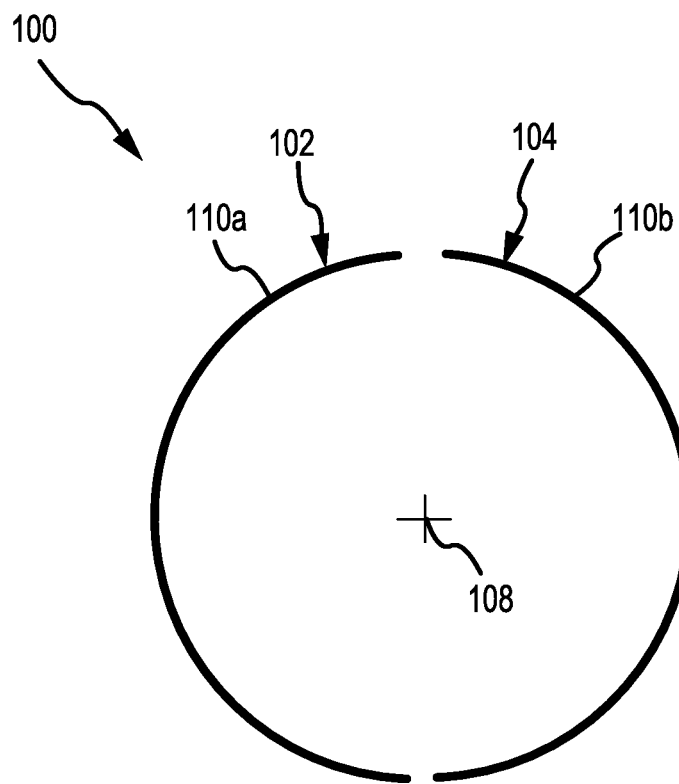
FIG. 1 illustrates a front-view profile of a fan cowl, in accordance with various embodiments.

With reference to FIG. 1, a fan cowl 100 is illustrated, in accordance with various embodiments. Fan cowl 100 may include a first fan cowl half 102 and a second fan cowl half 104. First fan cowl half 102 may include a first outer skin 110a. Second fan cowl half 104 may include a second outer skin 110b. First outer skin 110a and second outer skin 110b may each comprise a semi-cylindrical geometry when viewed from the aft direction, as shown in the illustrated embodiment. First and second outer skins 110a, 110b may define a centerline axis 108. Stated differently, first and second outer skins 110a, 110b may be bent around/disposed about centerline axis 108.

First and second outer skins 110a, 110b may be made from a fiber reinforced thermoplastic. In various embodiments, first and second outer skins 110a, 110b may formed from a carbon fiber, glass fiber, aramid fiber, or any other suitable fiber in a thermoplastic matrix. Various thermoplastics may be used for forming a fiber reinforced thermoplastic component, as described herein, including amorphous thermoplastics (e.g., polyetherimide (PEI), polycarbonate (PC), polysulfone (PSU), polyethersulfone (PES)), semi crystalline thermoplastics (e.g., polyvinylidene fluoride (PVDF), polytetrafluoroethylene (PTFE), polyphenylene sulfide (PPS), polyetheretherketone (PEEK), polyetherketoneketone (PEKK), polyaryletherketone (PAEK)), or any other suitable thermoplastic.

In accordance with various embodiments, first and second outer skins 110a, 110b may be manufactured using an automated fiber placement (AFP) assembly, as described herein. Because first and second outer skins 110a, 110b serve as an aerodynamic surface in fan cowl applications, it may be desirable for first and second outer skins 110a, 110b to be formed having a smooth outer surface and to minimize wrinkling during the forming process. In this regard, first and second outer skins 110a, 110b may be manufactured using the assemblies and methods, as described herein. While the disclosed methods and assemblies may find particular use in connection with fan cowl skins, various aspects of the disclosed embodiments may be adapted for manufacturing a variety of fiber reinforced thermoplastic structures. For example, the disclosed methods and assemblies may be used to form other nacelle structures (e.g., inlets, lip skins, thrust reverser components, etc.) and/or any structure that is formed by AFP over a mold surface. As such, numerous applications of the present disclosure may be realized.

Figure 2:
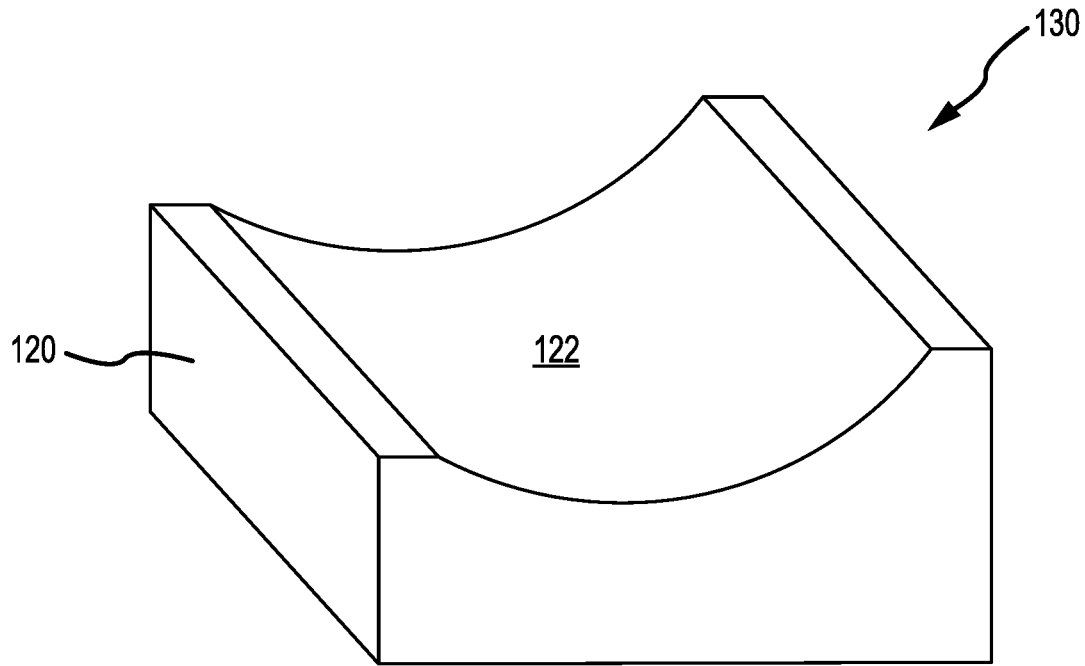
FIG. 2 illustrates a mold tool of an AFP assembly, in accordance with various embodiments.

With reference to FIG. 2, a mold tool 120 of an AFP assembly 130 is illustrated, in accordance with various embodiments. Mold tool 120 is configured to receive and support deposition of fiber strips during an AFP operation. Mold tool 120 may be formed of metal, metal alloy, and/or any material capable of withstanding the temperatures and pressures applied during the AFP operation. Mold tool 120 includes a mold surface 122. Mold surface 122 may include various contouring and/or curvatures and/or complex geometries (e.g. protrusions, surface angles, etc.). The shape of mold surface 122 is configured to produce the desired component surface shape. In this regard, after completion of the AFP operation, the finished component retains and complements the shape of mold surface 122. In various embodiments, mold surface 122 has a contour matching, or complementing, the desired geometry of first and second outer skins 110a, 110b, with momentary reference to FIG. 1.

Figure 3A:
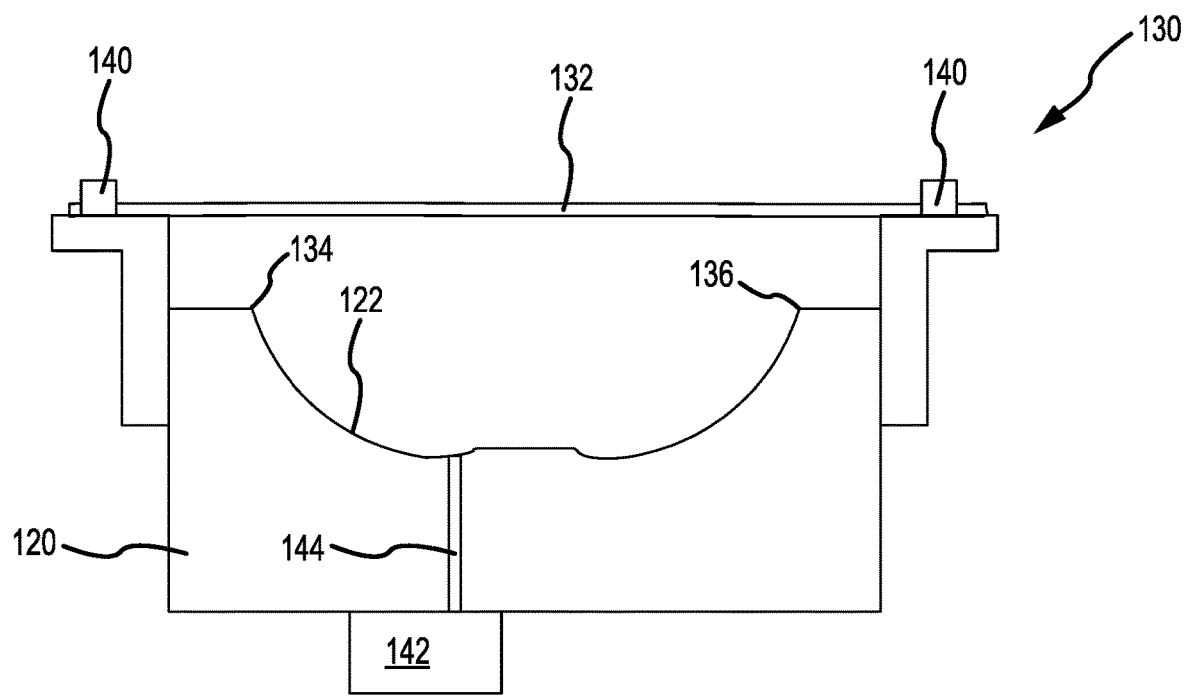
FIGS. 3A, 3B, 3C, and 3D illustrate deposition of a thermoplastic material over a mold tool of an AFP assembly, in accordance with various embodiments.

With reference to FIG. 3A, in accordance with various embodiments, AFP assembly 130 is configured to deposit a layer of thermoplastic material 132 (e.g., a layer of thermoplastic polymer, PEI, PC, PSU, PES, PVDF, PTFE, PPS, PEEK, PEKK, PAEK, or any other suitable thermoplastic) over mold surface 122. In accordance with various embodiments, thermoplastic material 132 is in the form of a sheet configured to cover mold surface 122. In this regard, thermoplastic material 132 may be a single, unibody member that extends continuously from a first edge 134 of mold surface 122 to a second, opposing edge 136 of mold surface 122. In accordance with various embodiments, a length and a width of thermoplastic material 132 are equal to or greater than the length and the width, respectively, of the final fiber reinforced thermoplastic part 180 (FIG. 5). Thermoplastic material 132 may be formed solely of thermoplastic. In this regard, thermoplastic material may be devoid of fibers.

In accordance with various embodiments, thermoplastic material 132 may be coupled to the mold tool 120. For example, in various embodiments, a sealing member 140 of AFP assembly 130 may be located around the perimeter of thermoplastic material 132 and may form an airtight seal between thermoplastic material 132 and mold tool 120. Sealing member 140 may comprise a tape, clamp, frame, clip, or any other structure capable of forming an airtight seal around thermoplastic material 132. A vacuum 142 (e.g., a vacuum pump or vacuum generator) may be coupled to mold tool 120. Vacuum 142 may be configured to evacuate the air from between mold surface 122 and thermoplastic material 132. For example, in various embodiments, mold tool 120 defines a channel 144 extending to mold surface 122. Vacuum 142 may be fluidly coupled to channel 144, such that vacuum 142 evacuates the air from between thermoplastic material 132 and mold surface 122 of mold tool 120 via channel 144.

Figure 3B:
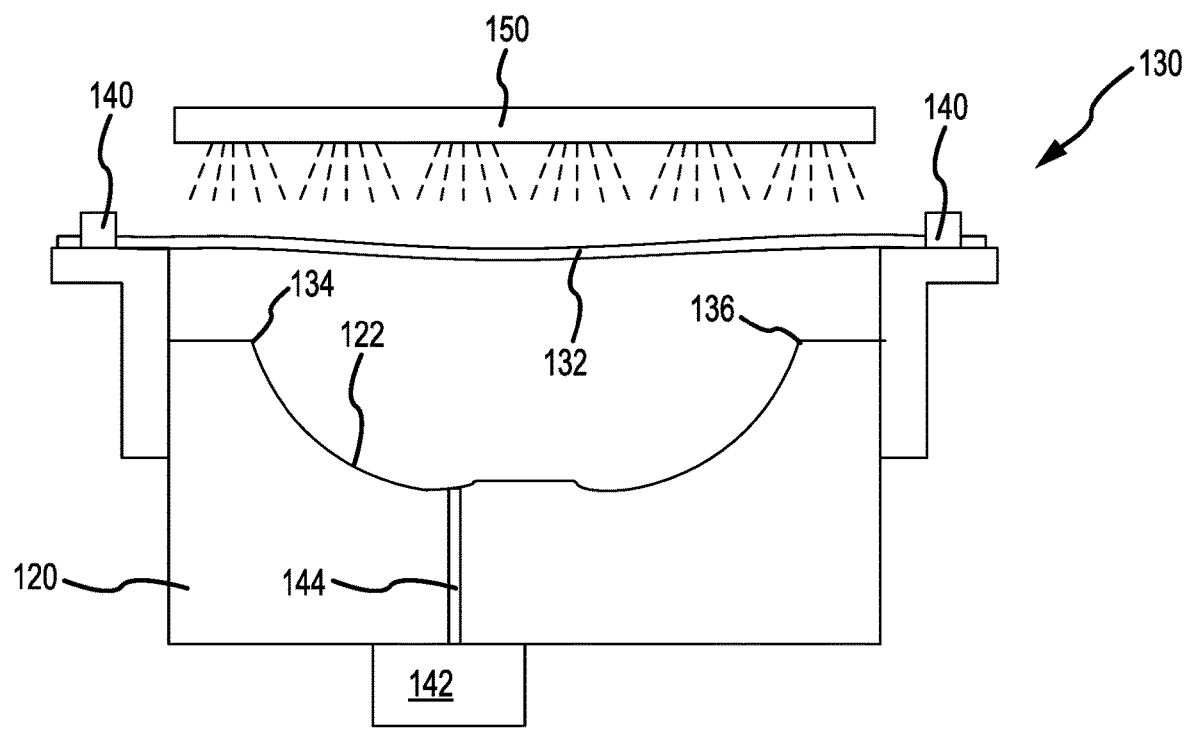

With reference to FIG. 3B, in accordance with various embodiments, a heating element 150 of AFP assembly 130 is configured to heat thermoplastic material 132 to a sufficient pliable forming temperature, wherein the thermoplastic material 132 becomes pliable for forming purposes. Prior to heating, thermoplastic material 132 may be rigid or generally non-pliable. In accordance with various embodiments, a pliable forming temperature for a thermoplastic material may be between 190° and 750° Fahrenheit (F) (87.8°-398.9° Celsius (C)). In various embodiments, the pliable forming temperature for the thermoplastic material 132 is greater than or equal to a glass transition temperature of thermoplastic material 132 and less than a melting point of the thermoplastic material 132. For example, a thermoplastic material having a melting point of 649° F. (343° C.) and a glass transition temperature of 249° F. (143° C.) may be heated to a pliable forming temperature of between 249° F. (143° C.) and 649° F. (343° C.). As will be appreciated by those skilled in the art, the suitable pliable forming temperature may vary depending on the particular type of thermoplastic material being used, as well as other factors, such as the thickness of thermoplastic material 132. As used herein, the term "pliable forming temperature" may refer to a range of temperatures, wherein thermoplastic material 132 is suitable for forming (usually equal to or greater than the glass transition temperature). In various embodiments, heating element 150 may be an infrared heater.

In accordance with various embodiments, AFP assembly 130 is configured to heat thermoplastic material 132 with thermoplastic material 132 spaced apart from mold surface 122. In this regard, sealing member 140 may be configured to couple thermoplastic material 132 to mold tool 120 such that thermoplastic material 132 is initially (e.g., prior to heating) spaced apart from mold surface 122. In response to heating, thermoplastic material 132 becomes pliable and begins to translate toward mold surface 122.

Figure 3C:
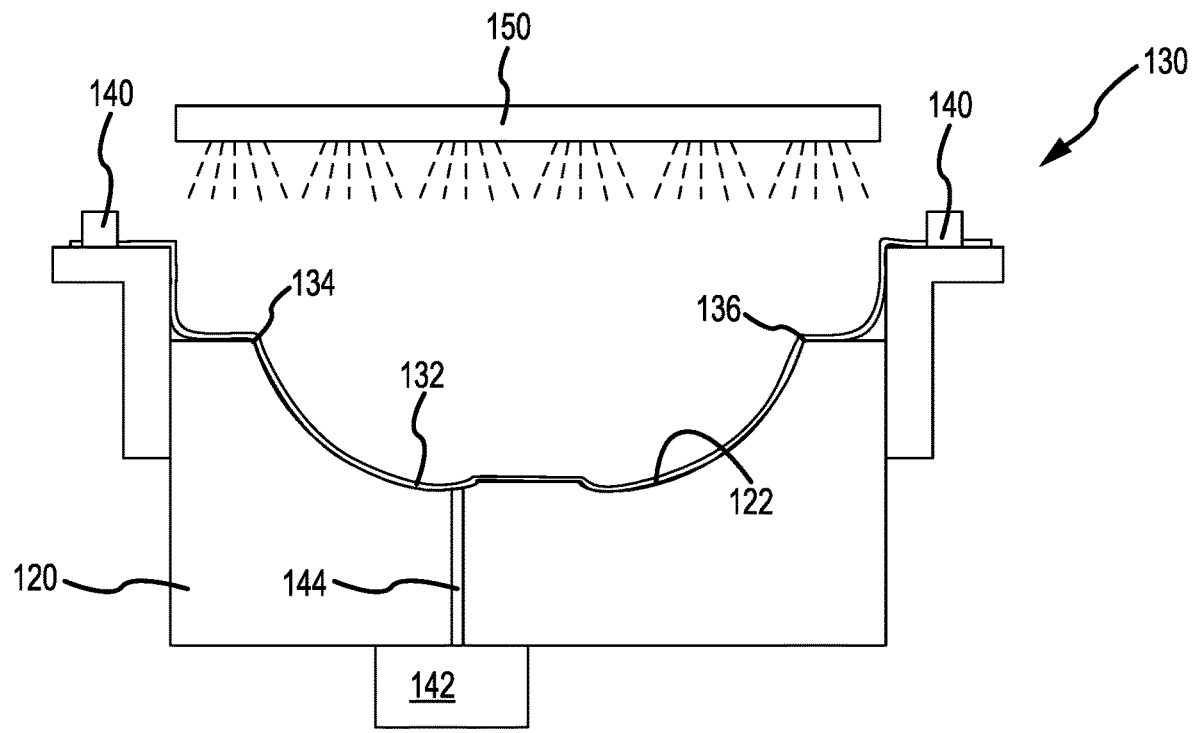
Figure 3D:
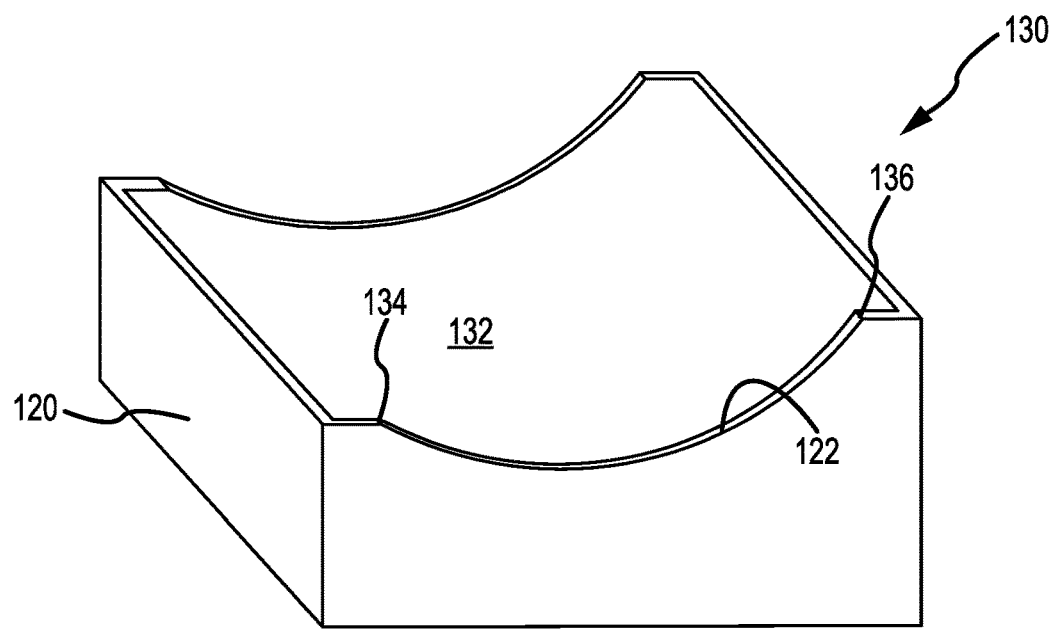

With additional reference to FIG. 3C, the pressure created by vacuum 142 causes thermoplastic material 132, which is at a pliable forming temperature, to conform to mold surface 122. In other words, thermoplastic material 132 is forced into contact with mold surface 122 and takes the shape (e.g., complements the contouring, curvatures and/or geometries) of mold surface 122. FIG. 3D shows thermoplastic material 132 formed on mold surface 122. Heating element 150 may be removed (e.g., powered off) in response to thermoplastic material 132 conforming to mold surface 122. In various embodiments, sealing member 140 may be removed and/or vacuum 142 may be turned off in response to thermoplastic material 132 conforming to mold surface 122. In various embodiments, thermoplastic material 132 may remain secured to mold tool 120 (e.g., via sealing member 140 or another means of securement) and/or under vacuum pressure (e.g., via vacuum 142), during the AFP process as described below with reference to FIGS. 4A, 4B, 4C, and 4D.

Figure 4A:
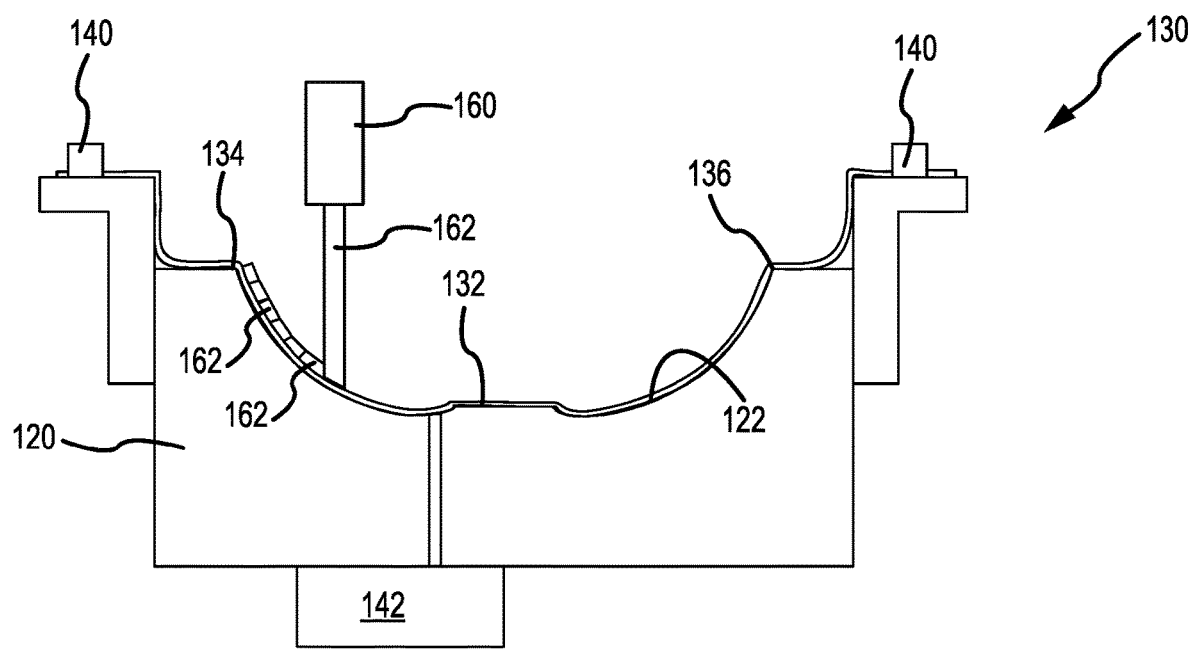
FIGS. 4A, 4B, 4C, and 4D illustrate deposition of fiber strips using an AFP assembly, in accordance with various embodiments.
Figure 4B:
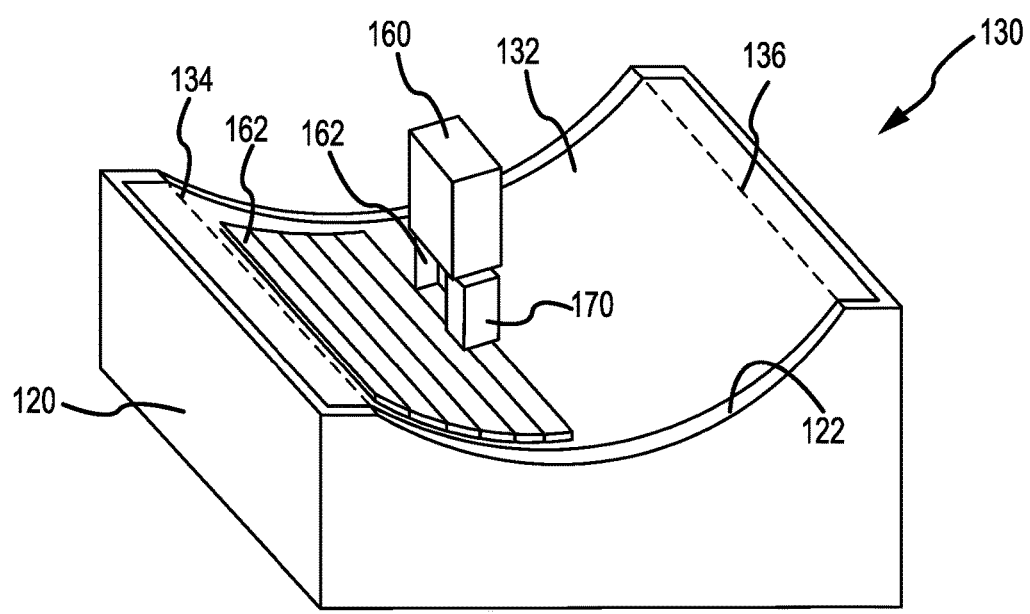

With reference FIGS. 4A and 4B, in accordance with various embodiments, a fiber dispensing assembly 160 is configured to dispense (e.g., deposit) fiber strips 162 over thermoplastic material 132. Fiber dispensing assembly 160 may dispense fiber strips 162 adjacent to one another. In this regard, each new fiber strip 162 may be laid directly adjacent to the previously laid fiber strip 162.

With momentary reference to FIGS. 6A and 6B, a plan view and a cross-section view, respectively, of a portion of a fiber strip 162 are illustrated. In accordance with various embodiments, fiber strip 162 comprises a plurality of fibers 164. Fibers 164 extend in a first direction or along the length L of fiber strips 162. In this regard, fiber strips 162 include a length (or first dimension) L, a width (or second dimension) W, and a height (or third dimension) H. Height H may be substantially less than the length L and width W, such that fiber strips 162 display flexibility relative to the plane formed by the length and width dimensions.

Fibers 164 may be carbon fibers, glass fibers, ceramic fibers, synthetic fibers such as poly-paraphenylene terephthalamide (KEVLAR), or any other suitable fiber. In various embodiments, fibers 164 are located within a matrix 166 of fiber strip 162. Matrix 166 may comprise a thermoplastic. In various embodiments, fiber strips 162 may comprise pre-impregnated carbon fiber tow, slit fiber tape, or any other fiber reinforced material. In various embodiments, matrix 166 and thermoplastic material 132 (FIG. 4A) are the same material.

Returning to FIGS. 4A and 4B, in various embodiments, fiber dispensing assembly 160 may include a consolidation element 170. Consolidation element 170 may be configured to apply heat and/or pressure to deposited fiber strips 162. The application of heat and/or pressure by consolidation element 170 may melt the matrices of fiber strips 162 and/or thermoplastic material 132, such that in response to consolidation, the matrices of fiber strips 162 are bonded (e.g., cross-linked) together and to thermoplastic material 132. Consolidation element 170 is configured to heat fiber strips 162 and thermoplastic layer 132 above their respective melting points. The pressure applied by consolidation element 170 tends to force fiber strips 162 and/or thermoplastic material 132 toward mold surface 122, thereby further facilitating the conformation of fiber strips 162 and/or thermoplastic material 132 to the shape of mold surface 122.

Figure 4C:
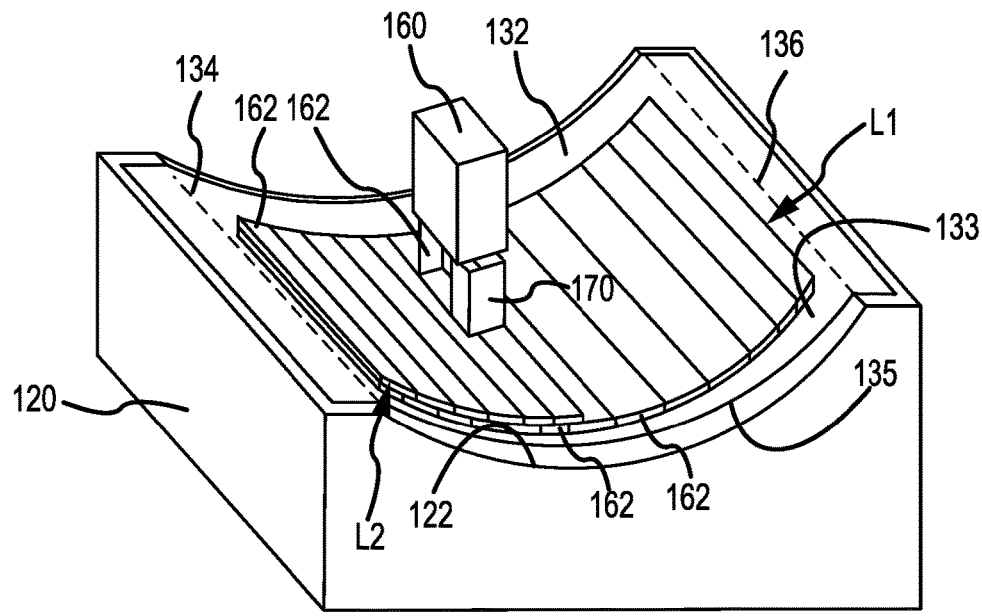

With additional reference to FIG. 4C, fiber dispensing assembly 160 may deposit a plurality of layers of fiber strips 162 on top of one another. For example, a first layer L1 of fiber strips 162 is deposited directly on (i.e., in contact with) surface 133 of thermoplastic material 132. Surface 133 is opposite surface 135 of thermoplastic material 132. Surface 135 contacts mold surface 122. Fiber dispensing assembly 160 then deposits a second layer L2 of fiber strips 162 on the first layer L1 of fiber strips 162. While FIG. 4C illustrates the fiber strips 162 of adjacent fiber strip layers L1, L2 being deposited in the same direction (e.g., parallel to first and second edges 134, 136), it is contemplated and understood that fiber dispensing assembly 160 may deposit fiber strips 162 in any direction and/or combinations of directions. For example, in various embodiments, the fiber strips 162 of second layer L2 may be laid in a direction substantially perpendicular to the direction in which the fiber strips 162 of first layer L1 were laid. Consolidation element 170 may be configured to apply heat and/or pressure to deposited fiber strips 162 of second layer L2. The application of heat and/or pressure by consolidation element 170 may simultaneously melt the matrices of the fiber strips 162 of first layer L1 and second layer L2, such that in response to consolidation, the matrices of the fiber strips 162 of layer L1 and of second layer L2 are bonded (e.g., cross-linked) together.

Figure 4D:
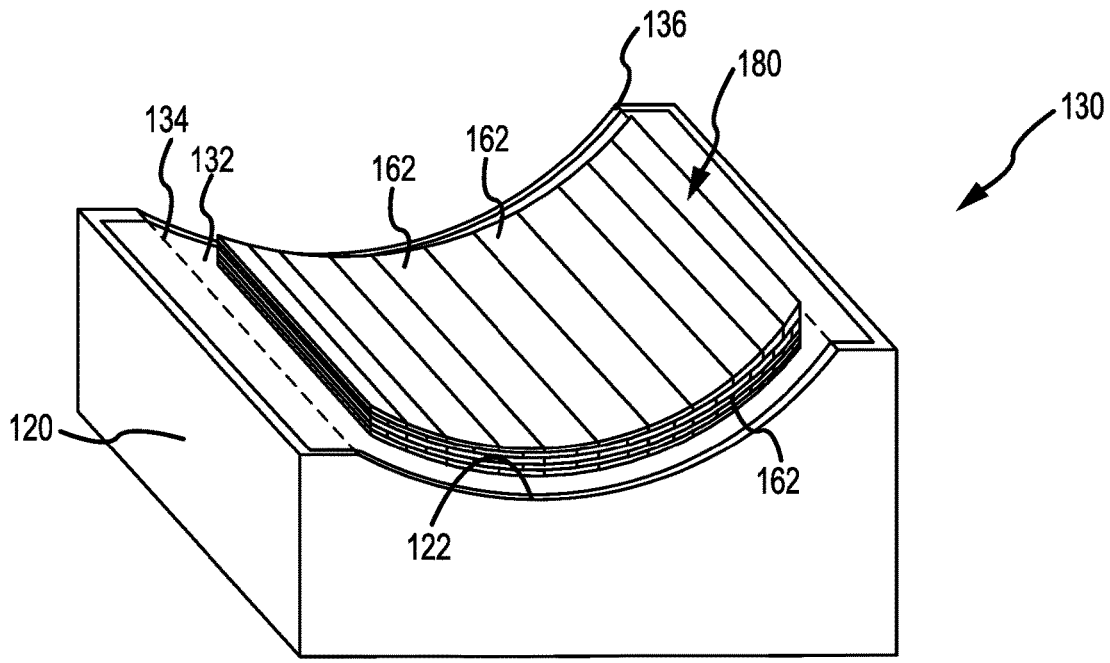

With additional reference to FIG. 4D, fiber dispensing assembly 160 continues depositing fiber strips 162 until a part 180 having the desired number of fiber strip layers is formed (e.g., until the desired part thickness is achieved). While FIGS. 4A, 4B, 4C, and 4D, show fiber strips 162 as distinguishable from one another, it is contemplated and understood that after consolidation (e.g., after the matrices have been melted together) fiber strips 162 are generally indistinguishable from one another. In various embodiments, fiber strips 162 may be consolidated after the desired number of fiber strip layers have been deposited (e.g., desired part thickness is achieved). For example, in various embodiments, after all of the fiber strips 162 are deposited, mold tool 120 and the fiber strip layup formed thereon may be placed in an oven and/or in a vacuum bag, wherein heat and pressure (e.g., vacuum) are applied to the fiber strips 162. Consolidating all of the fiber strips 162 simultaneously tends to decrease manufacturing times.

FIG. 5 shows part 180 after removal from mold tool 120. With combined reference to FIG. 5 and FIG. 4D, after the final fiber strip layer is consolidated, part 180 is removed from mold tool 120. In various embodiments, the part 180 (and thermoplastic material 132, which now part of part 180) may be removed from mold tool 120 by turning off vacuum 142 (FIG. 4A). With the vacuum pressure removed, the part 180 may be pulled off of mold surface 122. In various embodiments, part 180 may be trimmed, or cut, to the desired dimensions after removing the part 180 from mold tool 120. In various embodiments, part 180 may be first outer skin 110a.

In various embodiments, stiffeners, doublers, or other buildup layers may be added to part 180. The additional buildup layers may be located on fiber strips 162 over a mold tool 120. The buildup layers may be attached to part 180 using any suitable attachment technique (e.g., ultrasonic welding, thermo-pressing, etc.). The buildup layers may be applied after consolidation of fiber strips 162 or prior to consolidation, such that attachment (e.g., bonding) of the buildup layers occurs during consolidation of fiber strips 162.

AFP assembly 130 may allow part 180 to be manufactured more quickly as compared to conventional AFP systems wherein multiple polyimide tape strips are applied to the mold surface. Conforming the thermoplastic material to the mold surface while heating the material, in conjunction with applying a vacuum pressure, may allow for more complex mold surface geometries, while minimizing, or eliminating, wrinkling.

Figure 7A:
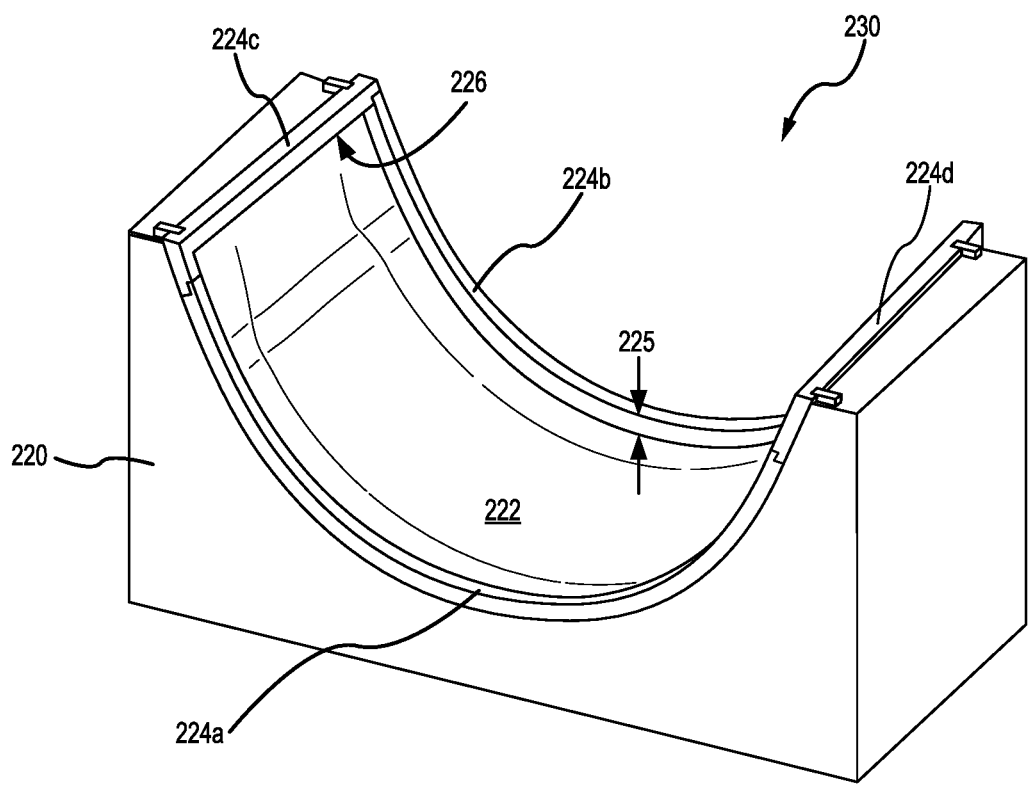
FIG. 7A illustrates a mold tool having attachment frames of an AFP assembly, in accordance with various embodiments.

Referring to FIG. 7A, a mold tool 220 of an AFP assembly 230 is illustrated, in accordance with various embodiments. Mold tool 220 and AFP assembly 230 may be used to form part 180 (FIG. 5). Mold tool 220 is configured to receive and support deposition of fiber strips during an AFP operation, for example, the AFP process described in FIGS. 4A, 4B, 4C, and 4D. Mold tool 220 includes a mold surface 222. Mold surface 222 may include various contouring and/or curvatures and/or complex geometries (e.g. protrusions, surface angles, etc.). After completion of the AFP operation, the finished component retains and complements the shape of mold surface 222. In various embodiments, mold surface 222 has a contour matching, or complementing, the desired geometry of first and second outer skins 110a, 110b, with momentary reference to FIG. 1.

Mold tool 220 includes attachment frames 224a, 224b, 224c, and 224d. Attachment frames 224a, 224b, 224c, and 224d may bound mold surface 222 (e.g., attachment frames 224a, 224b, 224c, and 224d may be located around and/or may surround mold surface 222). In various embodiments, attachment frame 224a and attachment frame 224b each have a curved shape. For example, attachment frame 224a and attachment frame 224b may each form a half circle (e.g., approximately 180° of a circle). Attachment frame 224b may be located on an opposite end of mold surface 222 relative to attachment frame 224a. In various embodiments, each of attachment frame 224a and attachment frame 224b may be raised relative to mold surface 222. In this regard, attachment frame 224a and attachment frame 224b may create a lip 225 relative to mold surface 222. Attachment frame 224c and attachment frame 224d each extend between attachment frame 224a and attachment frame 224b. Attachment frame 224c and attachment frame 224d may each have a generally straight, or planar portion. In this regard, attachment frames 224a, 224b, 224c, and 224d may together form a half cylinder. Attachment frame 224d may be located on an opposite end of mold surface 222 relative to attachment frame 224c. In various embodiments, each of attachment frame 224c and attachment frame 224d may be raised relative to mold surface 222. In this regard, attachment frame 224c and attachment frame 224c may each create a lip 226 relative to mold surface 222.

Figure 7B:
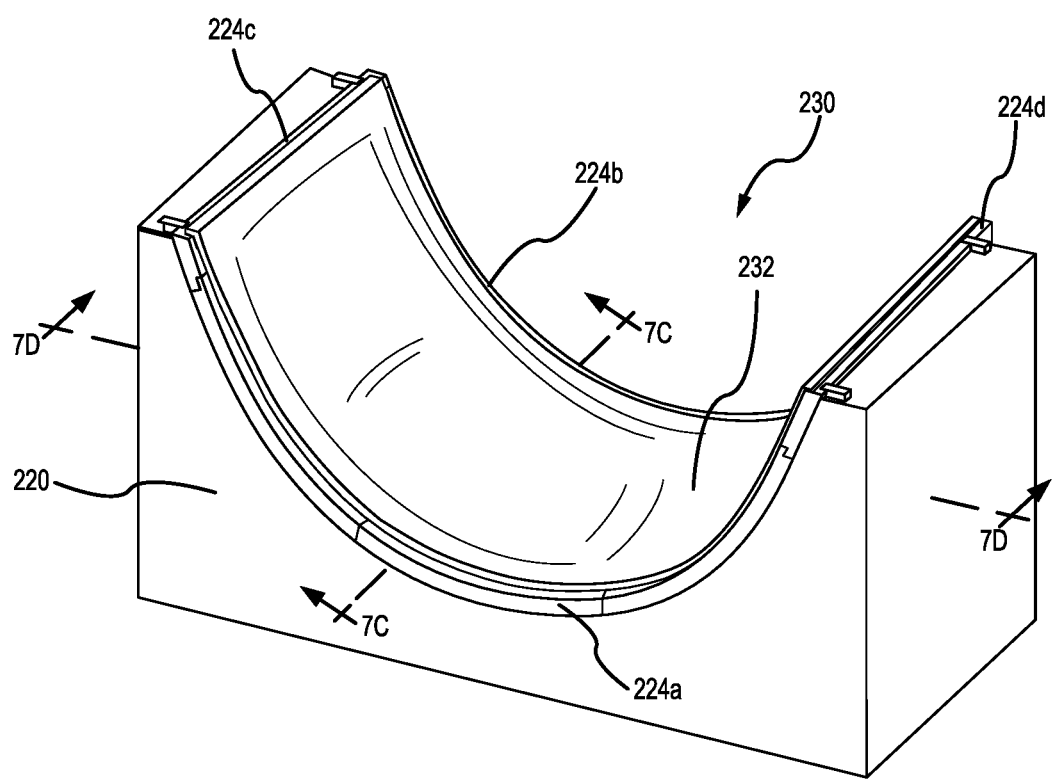
FIG. 7B illustrates a thermoplastic material located over the mold tool of FIG. 7A, in accordance with various embodiments.

With reference to FIGS. 7B, in accordance with various embodiments, AFP assembly 230 is configured to deposit a layer of thermoplastic material 232 (e.g., a layer of thermoplastic polymer, PEI, PC, PSU, PES, PVDF, PTFE, PPS, PEEK, PEKK, PAEK, or any other suitable thermoplastic) over mold tool 220. In accordance with various embodiments, thermoplastic material 232 is configured to be attach to mold tool 220 at attachment frames 224a, 224b, 224c, 224d. Thermoplastic material 232 may be a single, unibody member that extends continuously from attachment frame 224a to attachment frame 224 and from attachment frame 224c to attachment frame 224. Thermoplastic material 232 may be formed solely of thermoplastic. In this regard, thermoplastic material may be devoid of fibers.

Figure 7C:
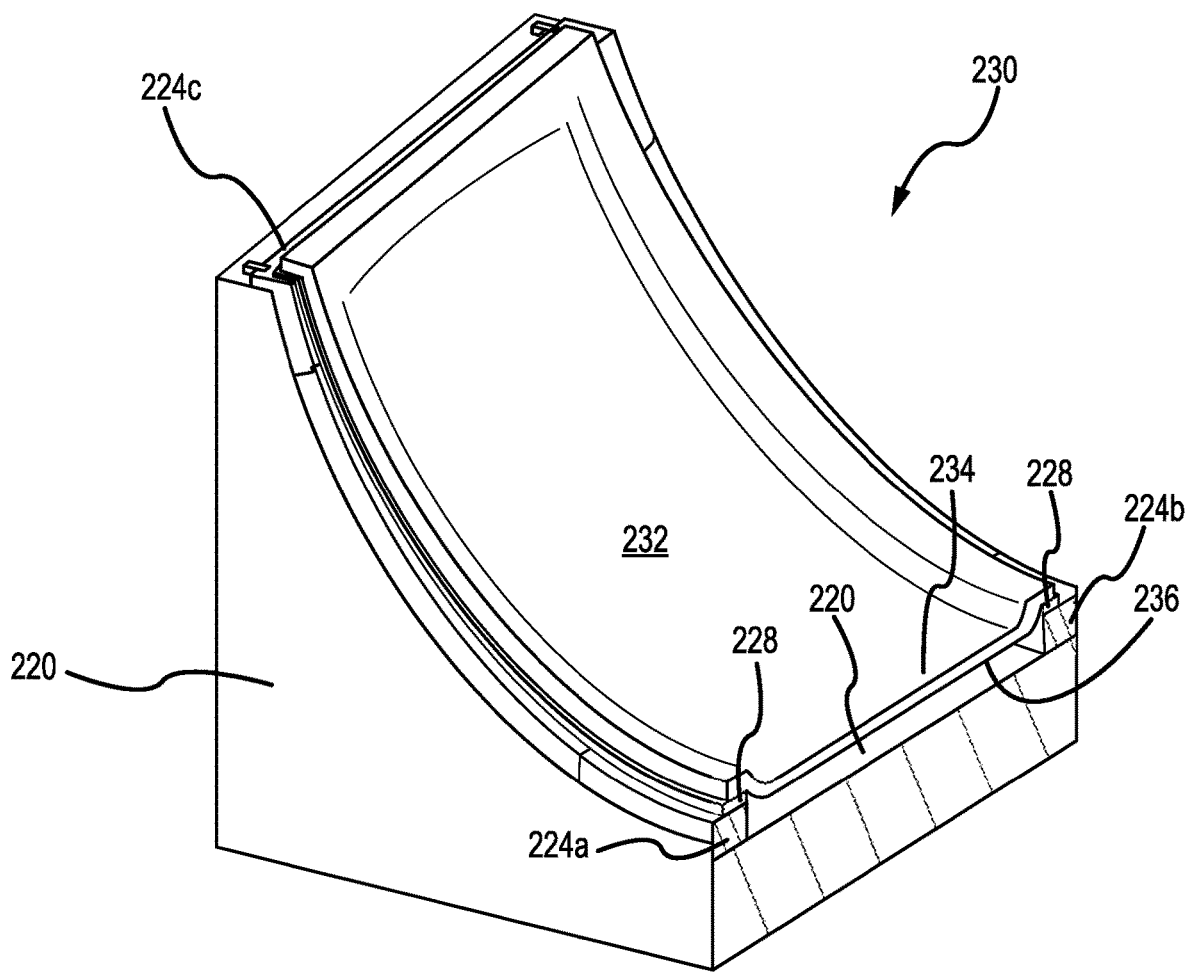
FIGS. 7C and 7D illustrate cross-section views taken along the lines 7C-7C and 7D-7D, respectively, in FIG. 7B, in accordance with various embodiments.
Figure 7D:
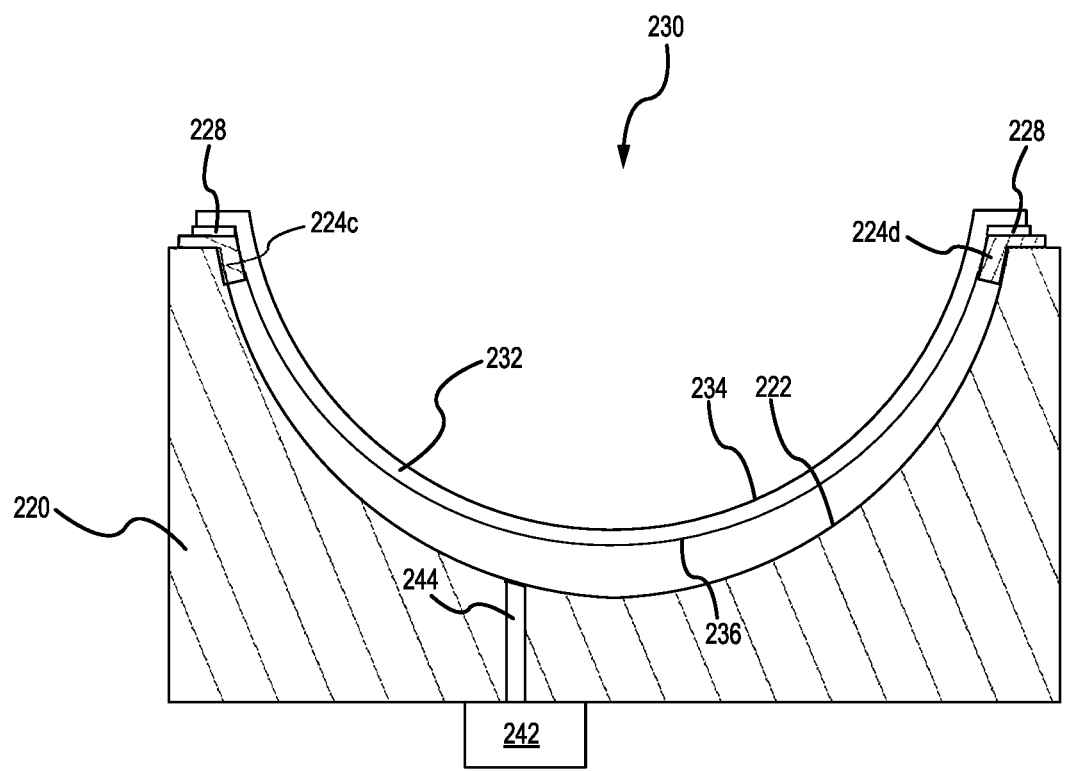

FIG. 7C shows a perspective cross section taken along the line 7C-7C in FIG. 7B. FIG. 7D shows a cross section taken along the line 7D-7D in FIG. 7B. With combined reference to FIGS. 7B, 7C, and 7D, a tape 228 (e.g., sealing/tacking tape; of a double-sided adhesive configuration) may be applied between thermoplastic material 232 and attachment frames 224a, 224b, 224c, and 224d to secure the thermoplastic material 232 relative to the mold tool 220. As such, the tape 228 is a representative example of the above-noted sealing member 140. Tape 228 may form an airtight seal between thermoplastic material 232 and attachment frames 224a, 224b, 224c, and 224d. In various embodiments, a clamp, frame, clip, or any other structure capable of forming an airtight seal around thermoplastic material 232 may be employed instead of, or in addition to, tape 228.

A vacuum 242 (e.g., a vacuum pump or vacuum generator) may be coupled to mold tool 220. Vacuum 242 may be configured to evacuate the air from between mold surface 222 and thermoplastic material 232. For example, in various embodiments, mold tool 220 defines a channel 244 extending to mold surface 222. Vacuum 242 may be fluidly coupled to channel 244, such that vacuum 242 evacuates the air from between thermoplastic material 232 and mold surface 222 of mold tool 220 via channel 244.

Figure 7E:
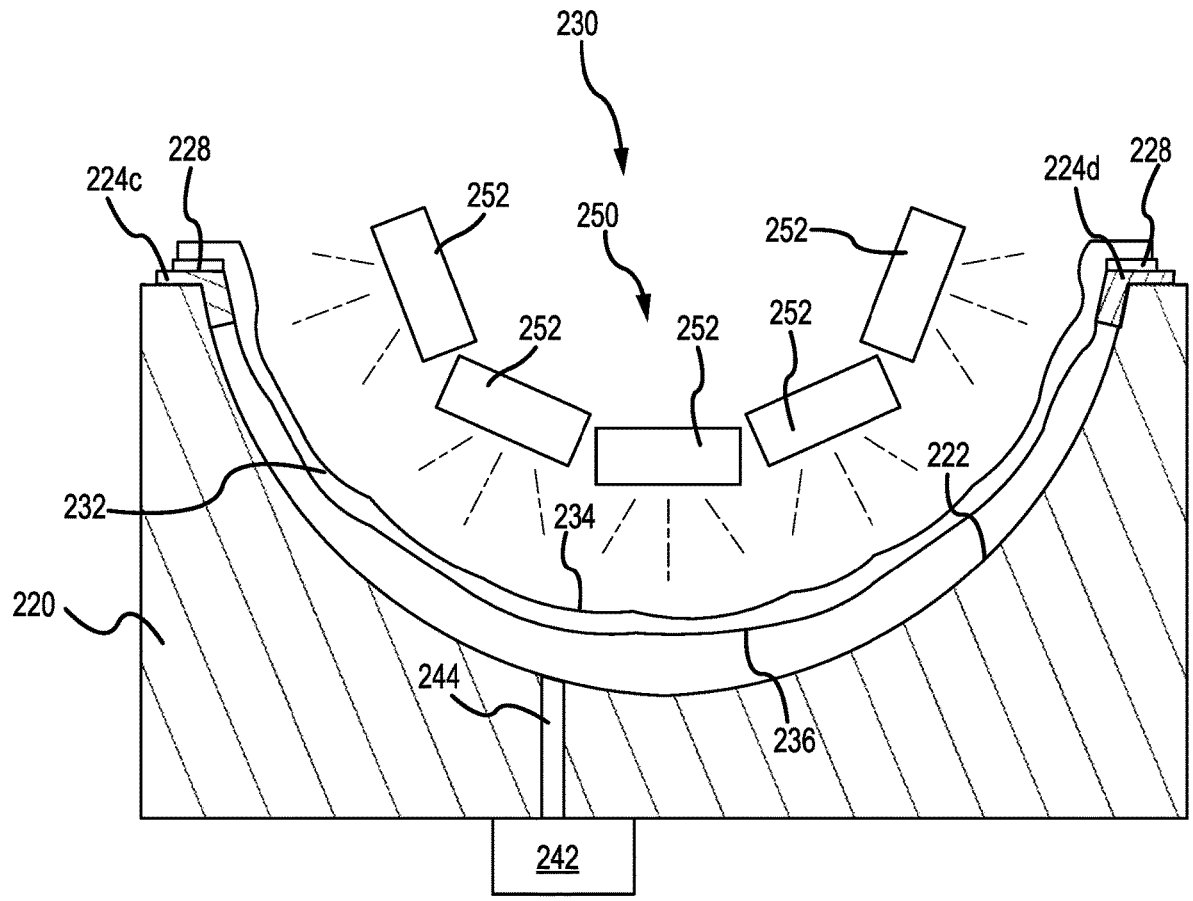
FIGS. 7E and 7F illustrate heating a thermoplastic material under vacuum, in accordance with various embodiments.

With reference to FIG. 7E, in accordance with various embodiments, AFP assembly 230 further includes a heating element 250 having a plurality of heater units 252 (e.g., infrared heat lamps) that are collectively positioned to at least generally follow the contour of the mold surface 222. The cross-section view of AFP assembly 230 shown in FIG. 7E is the same cross section as shown in FIG. 7D. The various heater units 252 may be at least substantially equally-spaced from the thermoplastic material 232. For example, heater units 252 may be at least substantially equally-spaced from an exterior surface 234 of thermoplastic material 232. Exterior surface 234 is oriented away from mold surface 222 of mold tool 220. In various embodiments, exterior surface 234 may have a generally concave shape prior to heating. One or more of the heater units 252 may be disposed in a different orientation, including where each heater unit 252 is disposed in a different orientation.

Heater units 252 are configured to heat thermoplastic material 232 to a sufficient pliable forming temperature, wherein the thermoplastic material 232 becomes pliable for forming purposes. In various embodiments, the pliable forming temperature for the thermoplastic material 232 is greater than or equal to a glass transition temperature of thermoplastic material 232 and less than a melting point of the thermoplastic material 232. As will be appreciated by those skilled in the art, the suitable pliable forming temperature may vary depending on the particular type of thermoplastic material being used, as well as other factors, such as the thickness of thermoplastic material 232. As used herein, the term "pliable forming temperature" may refer to a range of temperatures, wherein thermoplastic material 232 is suitable for forming (usually at or above the glass transition temperature). In various embodiments, heating element 150 may be an infrared heater.

In accordance with various embodiments, AFP assembly 230 is configured to heat thermoplastic material 232 with thermoplastic material 232 spaced apart from mold surface 122. In this regard, attachment frames 224a, 224b, 224c, and 224d may couple thermoplastic material 232 to mold tool 220 such that an interior surface 236 of thermoplastic material 232 is initially (e.g., prior to heating) spaced apart from mold surface 222. Interior surface 236 is oriented away from exterior surface 234 and toward mold surface 222. In response to heating, thermoplastic material 232 becomes pliable and begins to translate toward mold surface 222.

Figure 7F:
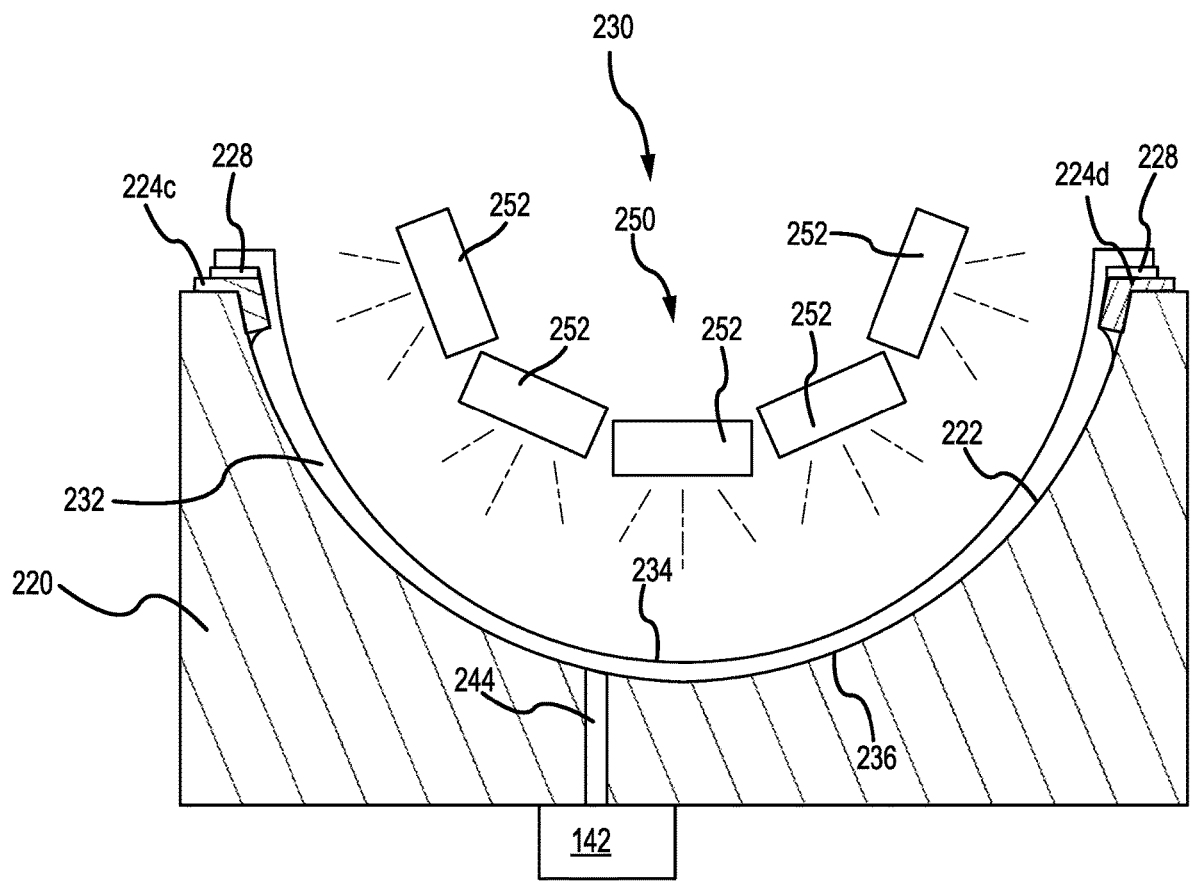

With additional reference to FIG. 7F, the pressure created by vacuum 242 causes thermoplastic material 232, which is at a pliable forming temperature, to conform to mold surface 222. In other words, thermoplastic material 232 is forced into contact with mold surface 222 and takes the shape (e.g., complements the contouring, curvatures and/or geometries) of mold surface 222.

In accordance with various embodiments, once thermoplastic material 232 has conformed to mold surface 222, an AFP process, as described above with reference to FIGS. 4A, 4B, 4C, and 4D, may be performed over thermoplastic material 232. In various embodiments, vacuum 242 may be turned off in response to thermoplastic material 232 conforming to mold surface 222. In various embodiments, thermoplastic material 132 may remain under vacuum pressure (e.g., via vacuum 142), during the AFP process.

Figure 8A:
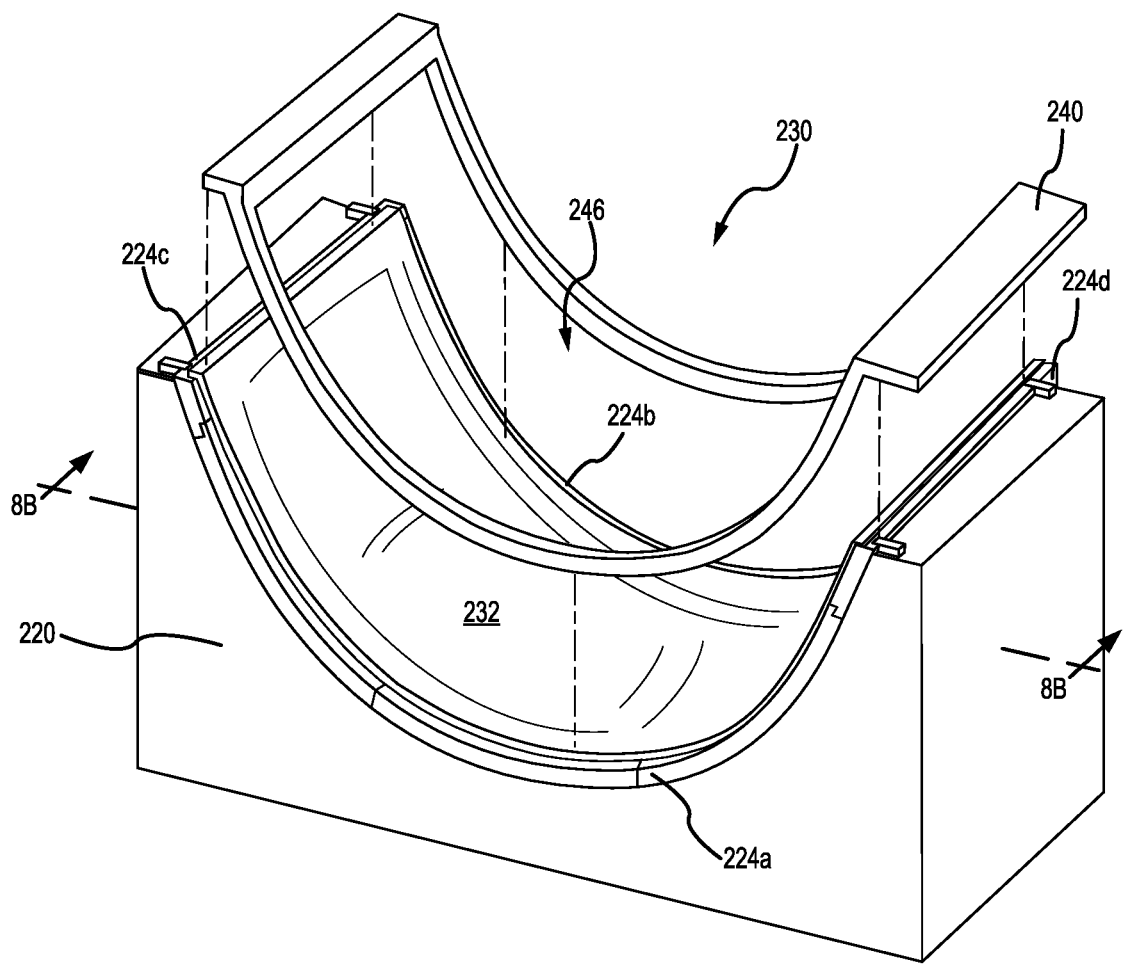
FIGS. 8A and 8B illustrate an assembly view and a cross section view, respectively, deposition of a thermoplastic material and a frame over a mold tool of an AFP assembly, in accordance with various embodiments.
Figure 8B:
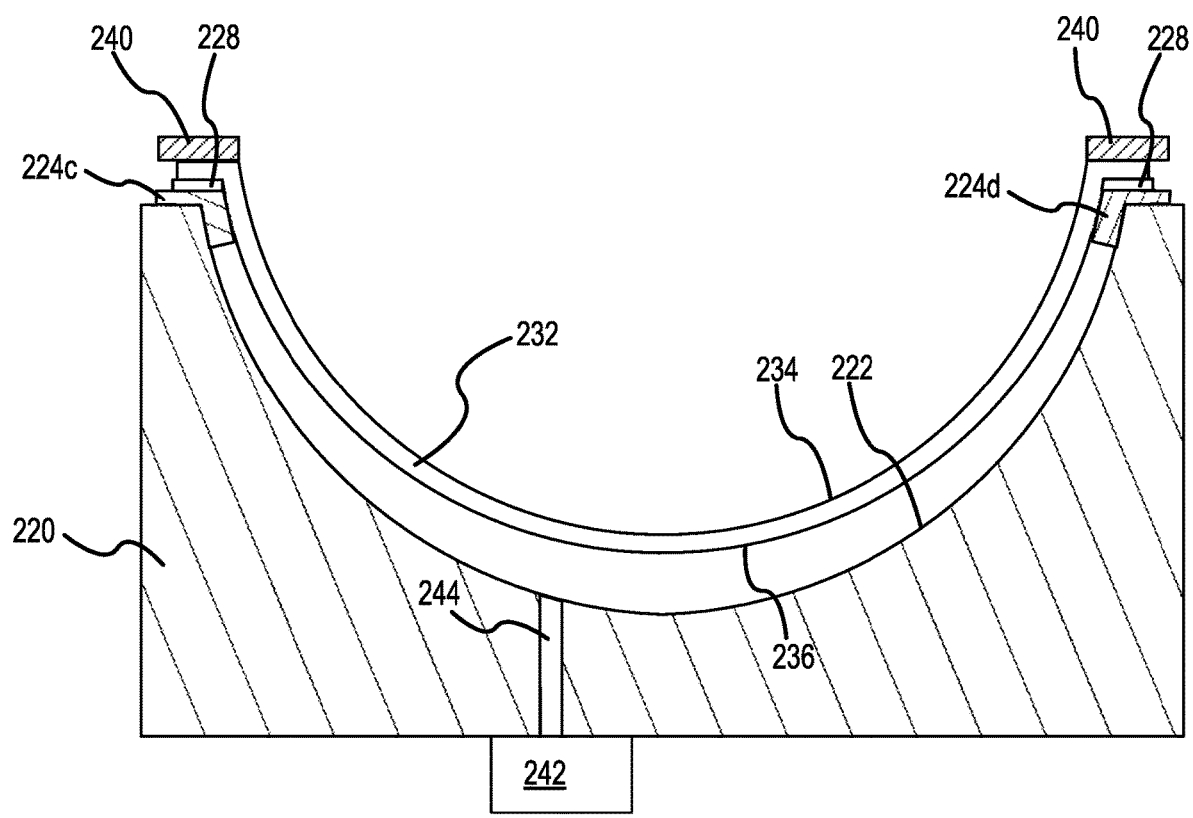

With reference to FIGS. 8A and 8B, in various embodiments, AFP assembly 230 may include a top frame 240. Top frame 240 may be located over and/or on thermoplastic material 232 and attachment frames 224a, 224b, 224c, 224d to secure the thermoplastic material 232 relative to the mold tool 220. As such, the top frame 240 is a representative example of the above-noted sealing member 140 (FIGS. 3A-3C). Top frame 240 may generally follow the collective shape of attachment frames 224a, 224b, 224c, 224d. In this regard, top frame 240 may be located around may generally surround the perimeter of mold surface 222 (FIG. 7A). Top frame 240 may define an opening 246. The shape of opening 246 (i.e., the portions of top frame 240 that define opening 246) may generally follow the contour of the mold surface 222 (FIG. 7A). Top frame 240 may force thermoplastic material 232 toward attachment frames 224a, 224b, 224c, 224d and/or otherwise cause an airtight seal to be formed between thermoplastic material 232 and attachment frames 224a, 224b, 224c, 224d. In various embodiments, tape 228 may located between thermoplastic material 232 and attachment frames 224a, 224b, 224c, 224d to enhance the hermetic seal between thermoplastic material 232 thermoplastic material 232 and attachment frames 224a, 224b, 224c, 224d. It will be appreciated that FIG. 8B illustrates thermoplastic material 232 and AFP assembly 230 prior to heating.

AFP assembly 230, in combination with the dispensing assembly 160 and in accordance with FIGS. 4A-4D, may be employed to manufacture part 180 (FIG. 5) more quickly as compared to conventional AFP systems wherein multiple polyimide tape strips are applied to the mold surface.

Conforming the thermoplastic material to the mold surface while heating the material, in conjunction with applying a vacuum pressure, may allow for more complex mold surface geometries, while minimizing, or eliminating, wrinkling.

Figure 9A:
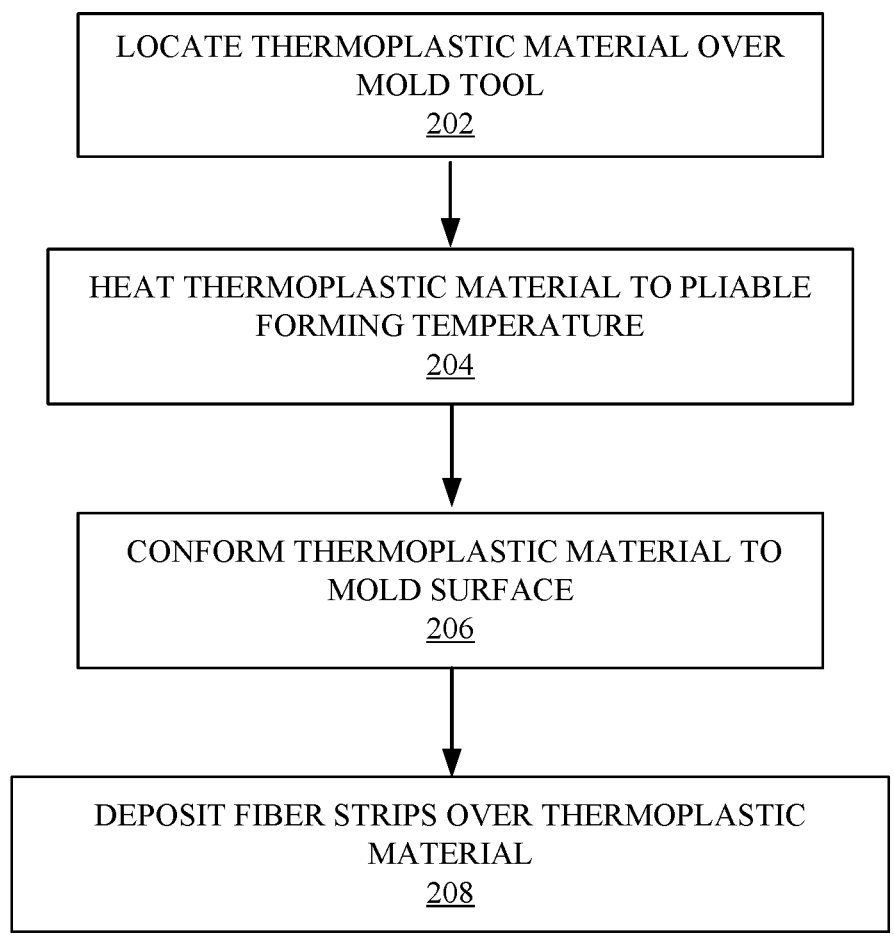
FIGS. 9A and 9B illustrate flow charts for a method for forming a fiber reinforced thermoplastic component, in accordance with various embodiments.

With to FIG. 9A, a method 200 for forming a fiber reinforced thermoplastic component is illustrated. In accordance with various embodiments, method 200 may include locating a thermoplastic material over a mold tool (step 202), heating the thermoplastic material to a pliable forming temperature (step 204), conforming the thermoplastic material to a mold surface of the mold tool (step 206), and depositing a plurality of fiber strips over the thermoplastic material (step 208).

In various embodiments, step 202 may include disposing an exterior surface of the thermoplastic material in a concave configuration and facing a plurality of heater units and step 204 may include disposing each heater unit in at least substantially equally-spaced relation to the exterior surface of the thermoplastic material.

Figure 9B:
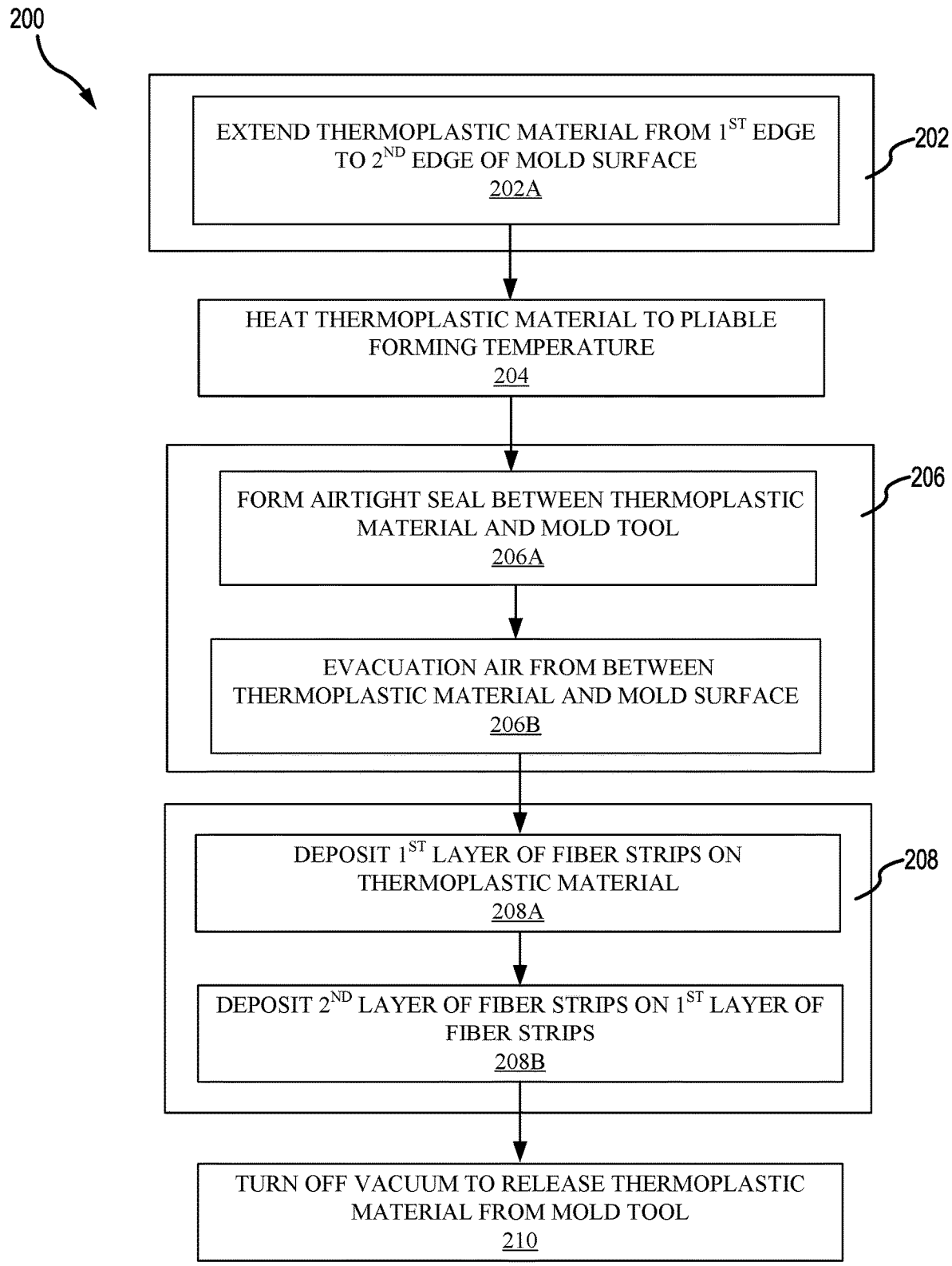

With reference to FIG. 9B, in various embodiments, step 202 includes extending the thermoplastic material continuously from a first edge of the mold surface to a second edge of the mold surface, with the second edge being opposite the first edge. In various embodiments, step 206 may include forming an airtight seal between the thermoplastic material and the mold tool (step 206A) and evacuating air from between the thermoplastic material and the mold surface of the mold tool (step 206B). In various embodiments, step 206A may include forming an airtight seal between the thermoplastic material and a plurality of attachment frames located around a perimeter of the mold surface. In various embodiments, forming the airtight seal between the thermoplastic material and the plurality of attachment frames may include attaching a tape to the thermoplastic material the plurality of attachment frames. In various embodiments, forming the airtight seal between the thermoplastic material and the plurality of attachment frames may include locating a top frame on an exterior surface of the thermoplastic material. In various embodiments, step 206B may include powering on a vacuum fluidly coupled to a channel defined by the mold tool.

In various embodiments, step 208 may include depositing a first layer of fiber strips on the thermoplastic material (step 208A) and depositing a second layer of fiber strips on the first layer of fiber strips (step 208B). In various embodiments, method 200 may comprise applying heat and pressure to the first layer of fiber strips prior to depositing the second layer of fiber strips. (i.e. prior to step 208B). In various embodiments, method 200 may further comprising releasing the thermoplastic material from the mold tool by turning off the vacuum (step 210).

Using method 200 may allow part 180 (FIG. 5) to be manufactured more quickly as compared to conventional AFP systems wherein multiple polyimide tape strips are applied to the mold surface. Conforming the thermoplastic material to the mold surface while heating the material, in conjunction with applying a vacuum pressure, may allow for more complex mold surface geometries, while minimizing, or eliminating, wrinkling.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a fiber reinforced thermoplastic part, the method comprising:
   locating a sealing member around a perimeter of a thermoplastic material;
   locating the thermoplastic material over a mold tool, wherein the mold tool comprises a mold surface and wherein the mold surface comprises at least one planar surface and at least one curved surface;
   prior to heating, forming an airtight seal between the thermoplastic material and the mold tool via the sealing member, the sealing member configured to couple the thermoplastic material to the perimeter of the least one planar surface and the at least one curved surface the mold tool such that the thermoplastic material is spaced apart from the mold surface of the mold tool;
   heating the thermoplastic material to a pliable forming temperature;
   conforming the thermoplastic material to the mold surface of the mold tool; and depositing a plurality of fiber strips over the thermoplastic material.

2. The method of claim 1, wherein conforming the thermoplastic material to the mold surface of the mold tool comprises:
evacuating air from between the thermoplastic material and the mold surface of the mold tool.

3. The method of claim 2, wherein heating the thermoplastic material to the pliable forming temperature comprises heating the thermoplastic material with the thermoplastic material spaced apart from the mold surface.

4. The method claim 2, wherein depositing the plurality of fiber strips over the thermoplastic material includes:
depositing a first layer of fiber strips on the thermoplastic material; and
depositing a second layer of fiber strips on the first layer of fiber strips.

5. The method of claim 4, further comprising applying heat and pressure to the first layer of fiber strips prior to depositing the second layer of fiber strips.

6. The method of claim 2, wherein the pliable forming temperature is greater than or equal to a glass transition temperature of the thermoplastic material and less than a melting point of the thermoplastic material.

7. The method of claim 2, wherein locating the thermoplastic material over the mold tool comprises disposing an exterior surface of the thermoplastic material in a concave configuration, the exterior surface facing a plurality of heater units, and wherein heating the thermoplastic material to the pliable forming temperature comprises disposing each heater unit of the plurality of heater units in at least substantially equally-spaced relation to the exterior surface.

8. The method of claim 2, wherein evacuating air from between the thermoplastic material and the mold surface of the mold tool comprises powering on a vacuum fluidly coupled to a channel defined by the mold tool.

9. The method of claim 8, further comprising releasing the thermoplastic material from the mold tool by turning off the vacuum.

10. A method for forming a fiber reinforced thermoplastic part, the method comprising:
locating a thermoplastic material over a mold tool such that the thermoplastic material is spaced apart from a mold surface of the mold tool, wherein the mold surface comprises at least one planar surface and at least one curved surface;
prior to heating, forming an airtight seal between the thermoplastic material and a plurality of attachment frames located around and surrounding a perimeter of the mold surface of the mold tool, wherein the plurality of attachment frames comprise at least one planar attachment frame and at least one curved attachment frame such that the plurality of attachment frames conforms to the mold surface of the mold tool, wherein forming the airtight seal between the thermoplastic material and the plurality of attachment frames includes the use of a sealing member between the thermoplastic material and the plurality of attachment frames, the sealing member configured to couple the thermoplastic material to the plurality of attachment frames;
heating the thermoplastic material to a pliable forming temperature;
evacuating air from between the thermoplastic material and the mold surface; and
depositing a plurality of fiber strips over the thermoplastic material.

11. The method of claim 10, wherein forming the airtight seal between the thermoplastic material and the plurality of attachment frames comprises locating a top frame on an exterior surface of the thermoplastic material.

12. The method of claim 10, further comprising consolidating a first fiber strip of the plurality of fiber strips with the thermoplastic material by heating the thermoplastic material and the first fiber strip to a temperature sufficient to melt both the thermoplastic material and a matrix material of the first fiber strip.

13. The method of claim 10, wherein heating the thermoplastic material to the pliable forming temperature comprises disposing a plurality of heater units over the thermoplastic material.

14. The method of claim 10, further comprising releasing the thermoplastic material from the mold tool by turning off a vacuum fluidly coupled to a channel extending to the mold surface.

* * * * *